(12) United States Patent
Frayne et al.

(10) Patent No.: US 11,683,472 B2
(45) Date of Patent: Jun. 20, 2023

(54) SUPERSTEREOSCOPIC DISPLAY WITH ENHANCED OFF-ANGLE SEPARATION

(71) Applicant: Looking Glass Factory, Inc., Brooklyn, NY (US)

(72) Inventors: Shawn Frayne, Tampa, FL (US); Tung Yiu Fok, Sha Tin (HK); Shiu Pong Lee, Quarry Bay (HK)

(73) Assignee: Looking Glass Factory, Inc., Brooklyn, NY (US)

( * ) Notice: Subject to any disclaimer, the term of this patent is extended or adjusted under 35 U.S.C. 154(b) by 271 days.

(21) Appl. No.: 17/328,076

(22) Filed: May 24, 2021

(65) Prior Publication Data
US 2021/0281824 A1    Sep. 9, 2021

Related U.S. Application Data

(63) Continuation of application No. 16/374,955, filed on Apr. 4, 2019, now Pat. No. 11,051,006, which is a
(Continued)

(51) Int. Cl.
| | |
|---|---|
| H04N 13/368 | (2018.01) |
| G02B 27/00 | (2006.01) |
| H04N 13/346 | (2018.01) |
| H04N 13/305 | (2018.01) |
| H04N 13/32 | (2018.01) |
| G02B 30/27 | (2020.01) |

(Continued)

(52) U.S. Cl.
CPC ....... *H04N 13/368* (2018.05); *G02B 27/0018* (2013.01); *G02B 30/27* (2020.01); *G02B 30/56* (2020.01); *H04N 13/305* (2018.05); *H04N 13/32* (2018.05); *H04N 13/346* (2018.05); *G02B 27/0093* (2013.01); *H04N 13/383* (2018.05); *H04N 13/398* (2018.05)

(58) Field of Classification Search
CPC .... H04N 13/368; H04N 13/305; H04N 13/32; H04N 13/346; H04N 13/383; H04N 13/398; G02B 30/56; G02B 30/27; G02B 27/0018; G02B 27/0093
USPC .......................................................... 359/463
See application file for complete search history.

(56) References Cited

U.S. PATENT DOCUMENTS

| | | | |
|---|---|---|---|
| 4,140,370 A | 2/1979 | Snaper et al. | |
| 4,340,275 A | 7/1982 | Henkes | |

(Continued)

FOREIGN PATENT DOCUMENTS

| | | | |
|---|---|---|---|
| CN | 103852819 A | 6/2014 | |
| CN | 106125322 A | 11/2016 | |

(Continued)

OTHER PUBLICATIONS

Broxton, Michael, et al., "Immersive Light Field Video with a Layered Mesh Representation", SIGGRAPH 2020 Technical Paper.
(Continued)

*Primary Examiner* — William R Alexander
(74) *Attorney, Agent, or Firm* — Jeffrey Schox; Randy Mehlenbacher

(57) ABSTRACT

A superstereoscopic display with enhanced off-angle separation includes a first light source; a lenticular lens optically coupled to the first light source that, with the first light source, generates a first light output having viewing angle dependency; and a high-index optical volume optically coupled to the lenticular lens.

20 Claims, 10 Drawing Sheets

Related U.S. Application Data continuation of application No. 16/044,355, filed on Jul. 24, 2018, now Pat. No. 10,298,921.

(60) Provisional application No. 62/661,605, filed on Apr. 23, 2018, provisional application No. 62/635,728, filed on Feb. 27, 2018.

(51) Int. Cl.
  *G02B 30/56* (2020.01)
  *H04N 13/398* (2018.01)
  *H04N 13/383* (2018.01)

(56) References Cited

U.S. PATENT DOCUMENTS

| | | | |
|---|---|---|---|
| 4,964,695 A | 10/1990 | Bradley et al. | |
| 5,359,454 A | 10/1994 | Steenblik et al. | |
| 5,521,724 A | 5/1996 | Shires | |
| 5,852,512 A | 12/1998 | Chikazawa | |
| 5,886,675 A | 3/1999 | Aye et al. | |
| 6,064,424 A | 5/2000 | Van Berkel et al. | |
| 6,097,394 A | 8/2000 | Levoy et al. | |
| 6,195,184 B1 | 2/2001 | Chao et al. | |
| 6,462,871 B1 | 10/2002 | Morishima | |
| 6,771,419 B1 | 8/2004 | Yamagishi et al. | |
| 6,798,390 B1 | 9/2004 | Sudo et al. | |
| 8,213,082 B2 | 7/2012 | Gaides et al. | |
| 8,248,694 B2 | 8/2012 | Sugiyama | |
| 8,416,276 B2 | 4/2013 | Kroll et al. | |
| 9,479,767 B2 | 10/2016 | Van Der Horst | |
| 9,486,386 B2 | 11/2016 | Bathiche et al. | |
| 9,584,797 B2 | 2/2017 | Hyde et al. | |
| 9,654,768 B2 | 5/2017 | Qin et al. | |
| 9,686,535 B2 | 6/2017 | Hamagishi et al. | |
| 9,704,220 B1 | 7/2017 | Bakar et al. | |
| 10,152,154 B2 | 12/2018 | Chen | |
| 10,551,913 B2 | 2/2020 | McCombe et al. | |
| 10,853,625 B2 | 12/2020 | McCombe et al. | |
| 10,904,479 B2 | 1/2021 | Karafin et al. | |
| 10,924,817 B2 | 2/2021 | Defaria et al. | |
| 10,948,648 B2 | 3/2021 | Ihas et al. | |
| 2004/0165262 A1 | 8/2004 | Alejo | |
| 2004/0169928 A1 | 9/2004 | Nilsen et al. | |
| 2004/0240777 A1 | 12/2004 | Woodgate et al. | |
| 2005/0078370 A1 | 4/2005 | Nishihara et al. | |
| 2005/0117016 A1 | 6/2005 | Surman | |
| 2006/0191177 A1 | 8/2006 | Engel | |
| 2006/0244918 A1 | 11/2006 | Cossairt et al. | |
| 2007/0164950 A1 | 7/2007 | Tajiri | |
| 2007/0165145 A1 | 7/2007 | Sugiyama | |
| 2009/0067057 A1 | 3/2009 | Sprague et al. | |
| 2009/0073087 A1 | 3/2009 | Janson et al. | |
| 2011/0193863 A1 | 8/2011 | Gremse et al. | |
| 2011/0316987 A1 | 12/2011 | Komoriya et al. | |
| 2012/0139897 A1 | 6/2012 | Butler et al. | |
| 2012/0313896 A1 | 12/2012 | Noda | |
| 2013/0088486 A1 | 4/2013 | Yoon et al. | |
| 2013/0201573 A1 | 8/2013 | Shiota | |
| 2013/0307948 A1 | 11/2013 | Odake et al. | |
| 2014/0118511 A1 | 5/2014 | Hyde et al. | |
| 2014/0204464 A1 | 7/2014 | Halverson et al. | |
| 2014/0267584 A1 | 9/2014 | Atzpadin et al. | |
| 2014/0320614 A1 | 10/2014 | Gaudreau | |
| 2014/0347454 A1 | 11/2014 | Qin et al. | |
| 2015/0022887 A1 | 1/2015 | Larson et al. | |
| 2016/0021365 A1 | 1/2016 | Effendi et al. | |
| 2016/0101013 A1 | 4/2016 | Bathiche et al. | |
| 2016/0234487 A1 | 8/2016 | Kroon et al. | |
| 2016/0313842 A1 | 10/2016 | Pacheco et al. | |
| 2017/0041596 A1 | 2/2017 | Park et al. | |
| 2017/0078650 A1 | 3/2017 | Frayne et al. | |
| 2017/0139213 A1 | 5/2017 | Schmidtlin | |
| 2017/0208292 A1 | 7/2017 | Smits | |
| 2017/0347083 A1 | 11/2017 | Grossmann | |
| 2018/0035096 A1 | 2/2018 | Gemayel | |
| 2018/0084245 A1 | 3/2018 | Lapstun | |
| 2018/0188550 A1 | 7/2018 | Frayne et al. | |
| 2019/0035125 A1 | 1/2019 | Bellows et al. | |
| 2019/0049899 A1 | 2/2019 | Gelman et al. | |
| 2019/0088004 A1 | 3/2019 | Lucas et al. | |
| 2019/0146234 A1 | 5/2019 | Yoshida | |
| 2019/0149808 A1 | 5/2019 | Ng et al. | |
| 2019/0196539 A1 | 6/2019 | Cassar | |
| 2019/0268588 A1 | 8/2019 | Frayne et al. | |
| 2019/0346615 A1 | 11/2019 | Johnson et al. | |
| 2020/0228881 A1 | 7/2020 | Defaria et al. | |
| 2020/0266252 A1 | 8/2020 | Cancel Olmo et al. | |
| 2020/0296327 A1 | 9/2020 | Karafin et al. | |
| 2020/0314415 A1 | 10/2020 | Karafin et al. | |
| 2020/0384371 A1 | 12/2020 | Karafin et al. | |
| 2021/0044795 A1 | 2/2021 | Karafin et al. | |
| 2021/0060405 A1 | 3/2021 | Karafin et al. | |
| 2021/0132693 A1 | 5/2021 | Pulli et al. | |
| 2021/0165212 A1 | 6/2021 | Christmas | |

FOREIGN PATENT DOCUMENTS

| | | |
|---|---|---|
| JP | 2010068202 A | 3/2010 |
| KR | 20140111553 A | 9/2014 |
| WO | 2006015562 A1 | 2/2006 |
| WO | 2015104239 A2 | 7/2015 |
| WO | 2018227098 A1 | 12/2018 |

OTHER PUBLICATIONS

Gotsch, Dan , et al., "TeleHuman2: A Cylindrical Light Field Teleconferencing System for Life-size 3D Human Telepresence", CHI 2018, Apr. 21-26, 2018, Montreal, QC, Canada.

Huzaifa, Muhammad , et al., "Exploring Extended Reality with ILLIXR: A New Playground for Architecture Research", arXiv:2004.04643v2, Mar. 3, 2021.

Kim, Kibum , et al., "TeleHum: Effects of 3D Perspective on Gaze and Pose Estimation with a Life-size Cylindrical Telepresence Pod", CHI 2021, May 5-10, 2021, Austin, Texas, USA.

Levoy, Marc , et al., "Light Field Rendering", ACM-0-89791-746-4/96/008, 1996.

Vertegaal, Roel , "Real Reality Interfaces with Interactive Light Field Displays", IMID 2018 Digest.

Zhang, Xujing , et al., "LightBee:A Self-Levitating Light Field Display for Hologrammatic Telepresence", CHI 2019, May 4-9, 2019, Glasgow, Scotland, UK.

"ELFSR1 Spatial Reality Display", https://electronics.sony.com/spatial-reality-display/p/elfsr1, downloaded on Mar. 5, 2020.

"Nanostructured Moth-Eye Anti-Reflective Coating", Synopsys, https://www.synopsys.com/photonic-solutions/product-applications/rsoft-optimization-nanostructured-moth-eye.html, downloaded Apr. 27, 2020.

"Privacy Screens for Laptops, Computers & Monitors", Pinterest, https://in.pinterest.com/pin/656892295631728414, downloaded Apr. 27, 2020.

"We developed the World's Most Advanced 3D Display Technology", https://www.dimenco.eu, downloaded Mar. 5, 2020.

"ELFSR1 Spatial Reality Display", https://electronics.sony.com/spatial-reality-display/p/elfsr1.

International Search Report and the Written Opinion, Application No. PCT/US19/015235, dated Apr. 4, 2019.

"We developed the World's Most Advanced 3D Display Technology", https://www.dimenco.eu.

An, Jungkwuen , et al., "Slim-panel holographic video display", Nature Communications vol. 11, Article No. 5568 (2020), published Nov. 10, 2020.

Chen, Renjie , et al., "Wide field view compressive light field display using a multilayer architecture and tracked viewers", Journal of the SID 22/10, 2015, pp. 525-534.

"Nanostructured Moth-Eye Anti-Reflective Coating", Synopsys, https://www.synopsys.com/photonic-solutions/product-applications/rsoft-optimization-nanostructured-moth-eye.html.

(56) References Cited

OTHER PUBLICATIONS

"Privacy Screens for Laptops, Computers & Monitors", Pinterest, https://in.pinterest.com/pin/656892295631728414/.
Dong, Yan-Yu, et al., "P-68: Dual-Side Floating Autosteroscopic 3D Display Based on Micro-Prism Array and Lenticular Sheet", SID Symposium Digest of Technical Paper/vol. 47, Issue 1, May 25, 3016.
Geng, Jason, "Three-dimensional display technologies", IEEE Intelligent Transportation System Society, Advances in Optics and Photonics 5, 456-535 (2013).
Wang, Yuedi, et al., "Three-dimensional light-field display with enhanced horizontal viewing angle by introducing a new lenticular lens array", Optics Communications 477 (2020) 126327.
Brar, Rajwinder Singh, et al., "Laser-Based Head-Tracked 3D Display Research", Journal of display technology, IEEE Service center, NY, US, vol. 6, No. 10, Oct. 1, 2010, pp. 531-543, XP011308937, ISSN: 1551-319X.
Liou, Jian-Chiun, et al., "Dynamic LED backlight 2D/3D switchable autostereoscopic multi-view display", Journal of display technology, IEEE Service center, NY, US, vol. 10, No. 8, Aug. 1, 2014, pp. 629-634, XP0111551837, ISSN: 1551-319X, DOI: 10.1109/JDT.2014.2307691.
Urey, Hakan, et al., "State of the art in stereoscopic and autostereoscopic displays", Proceedings of the IEEE, IEEE. New York, US, vol. 99, No. 4, Apr. 1, 2011 (Apr. 1, 2011), pp. 540-555. XP011363625, ISSN: 0018-9219, D0I: 10.1109/JPROC. 2010.2098351.

view at first angle view at second angle

SUPERSTEREOSCOPIC DISPLAY WITH ENHANCED OFF-ANGLE SEPARATION

CROSS-REFERENCE TO RELATED APPLICATIONS

This invention is a continuation of U.S. patent application Ser. No. 16/374,955, filed 4 Apr. 2019, which is a continuation of U.S. patent application Ser. No. 16/044,355, filed on 24 Jul. 2018, which claims the benefit of U.S. Provisional Application No. 62/635,728, filed on 27 Feb. 2018, and of U.S. Provisional Application No. 62/661,605, filed on 23 Apr. 2018, all of which are incorporated in their entireties by this reference.

TECHNICAL FIELD

This invention relates generally to the image display field, and more specifically to new and useful superstereoscopic displays with enhanced off-angle separation.

BACKGROUND

Image displays are an integral part of modern life. From televisions to monitors to smartphone and tablet screens, image displays provide users with the ability to view and interact with information presented in a variety of forms.

The advent of three-dimensional displays has enabled users to experience images with higher realism than would be possible with their two-dimensional counterparts; however, the vast majority of 3D displays require the use of a head-mounted display (HMD) or other cumbersome peripheral.

Free-space 3D displays remove the need for an HMD, allowing multiple users to see and manipulate content in a shared experience. Unfortunately, the few existing free-space 3D displays are hampered by a number of issues, including size, limited view angle, low resolution and brightness, scene distortion, and high cost. Thus, there exists a need in the image display field to create new and useful superstereoscopic displays with enhanced off-angle separation. This invention provides such new and useful displays.

DESCRIPTION OF THE INVENTION EMBODIMENTS

The following description of the invention embodiments of the invention is not intended to limit the invention to these invention embodiments, but rather to enable any person skilled in the art to make and use this invention.

1. Superstereoscopic Display with Enhanced Off-Angle Separation

Figure 1:
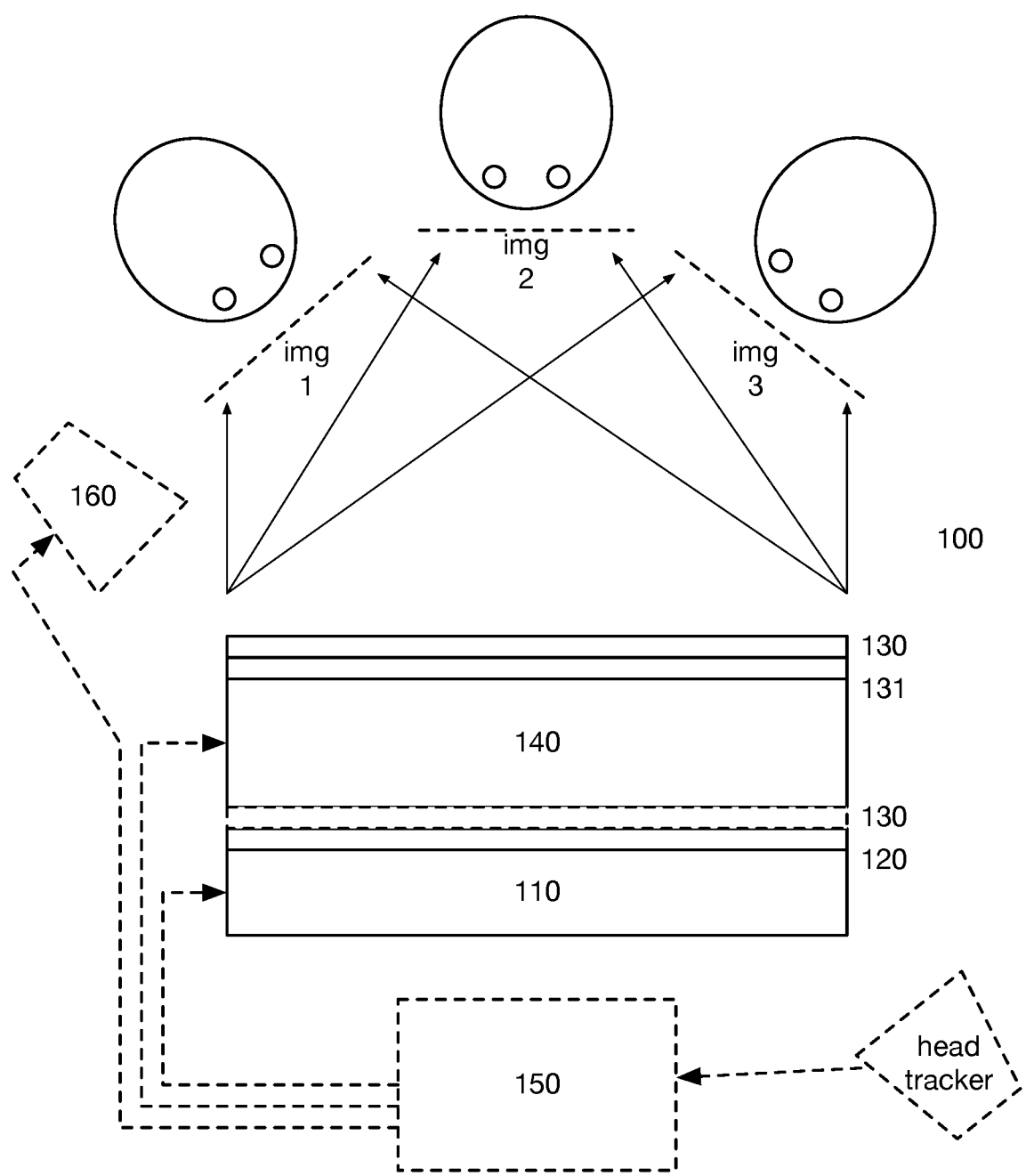
FIG. 1 is a top-down view of a display of an invention embodiment.

A superstereoscopic display 100 with enhanced off-angle separation includes a light source 110, a parallax generator 120, and a high-index optical volume 140, as shown in FIG. 1. The display 100 may additionally or alternatively include polarizers 130, quarter waveplates 131, optical volume guides 141, an onboard computer 150, and/or a contextual lighting system 160.

Figure 2A:
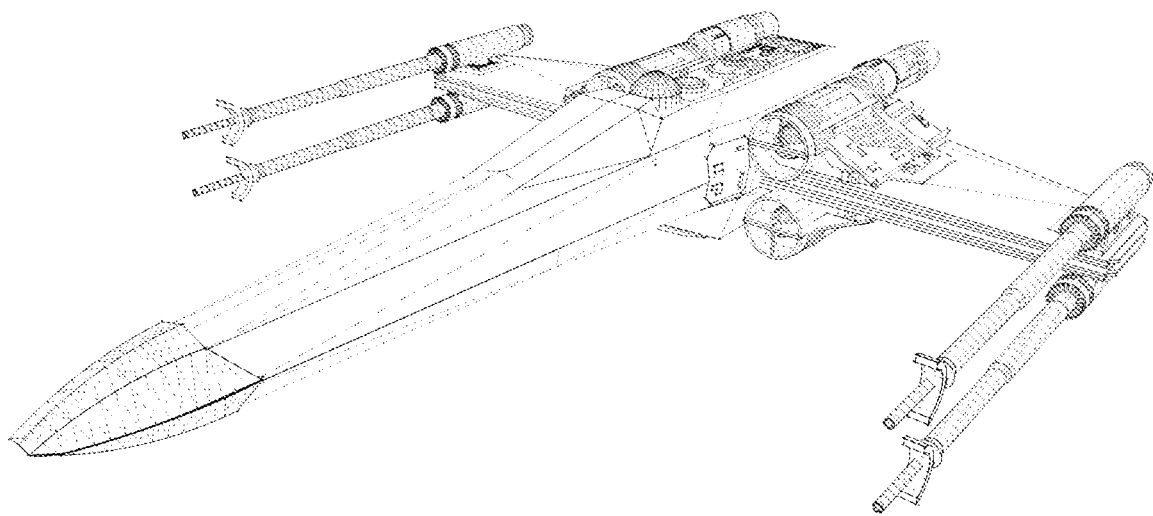
FIGS. 2A and 2B are stereoscopic views of a three-dimensional image.
Figure 2B:
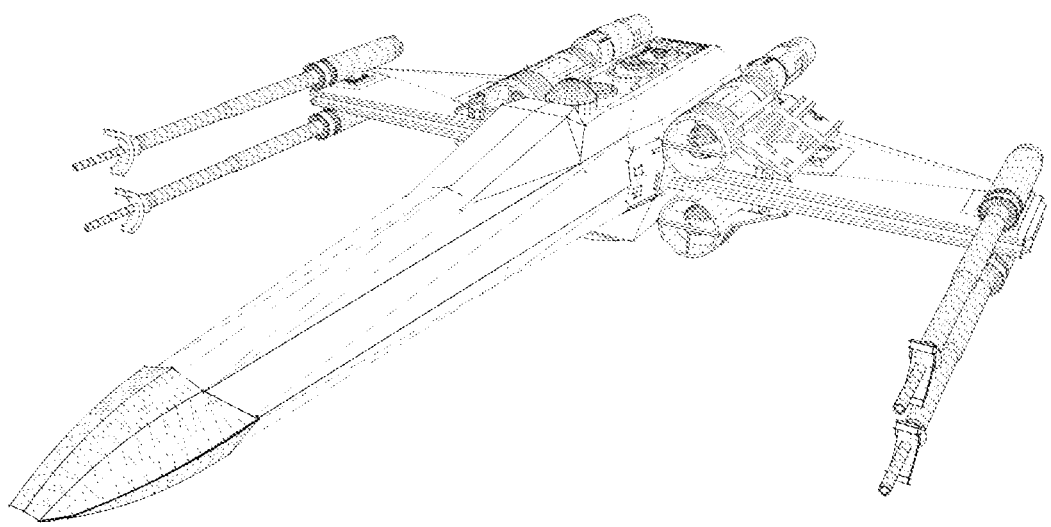

As shown in FIG. 1, the display 100 functions to enable viewers to see two- and/or three-dimensional image data from multiple perspectives at the same time. The display 100 generates an angle-dependent viewing experience, which can be used to provide a three-dimensional viewing experience (via stereopsis) and/or to provide viewers at different angles with different images depending on viewing angle (without necessarily causing the perception of depth). An example is as shown in FIGS. 2A and 2B. While the display 100 is capable of producing the same 3D image at multiple angles (e.g., viewer 1 has eyes at 0 and 5 degrees, which see image 1 and 2 respectively; viewer 2 has eyes at 20 and 25 degrees, which see image 1 and 2 respectively), the display 100 preferably produces a continuous unbroken scene (e.g., image 1 at 0 degrees, image 2 at 5 degrees ... image N at 5(N−1) degrees where N is an integer) to better provide an immersive viewing experience. Alternatively, the display 100 may utilize any set of images for any purpose.

Enhanced off-angle separation is preferably enabled by the high-index optical volume 140; by nature of its high index of refraction and shape, the optical volume 140 may cause the primary image(s) intended for a viewer at a particular viewing angle to appear closer to the viewer than otherwise would occur (without the optical volume 140), increasing the perception that the image produced by the light source no "floats" off of the screen. Further enhancing this effect, for images off-axis to the viewer at a particular viewing angle, the images may not appear as close as on-axis images do, appearing to the viewer to separate on- and off-axis images in space. This phenomenon is discussed in greater detail in the section on the high-index optical volume 140.

The light source 110 functions to generate images (i.e., light generated from image data) for display by the display 100. The light source 110 is preferably a planar two-dimensional display comprising a set of individually addressable pixels, but may additionally or alternatively be any suitable display. For example, the light source 110 may comprise one or more movable light sources; e.g., a laser that may be scanned across a set of positions to simulate the appearance of multiple light sources (i.e., display multiplexing).

The light source 110 is preferably an RGB color light source (e.g., each pixel includes red, green, and blue sub-pixels) but may additionally or alternatively be a substantially monochromatic light source or any other light source (e.g., a white light source).

The light source 110 is preferably a projector or projector light engine (e.g., DLP, laser, LCoS, and/or LCD projector) but may additionally or alternatively be any suitable display (e.g., an LCD monitor/TV display, an OLED display, an e-ink display, an LED array, a spinning LED array, an e-ink display, an electroluminescent display, a neon display, etc.). In one variation of a preferred embodiment, the light source 110 includes a liquid crystal panel with a collimated backlight.

Figure 3A:
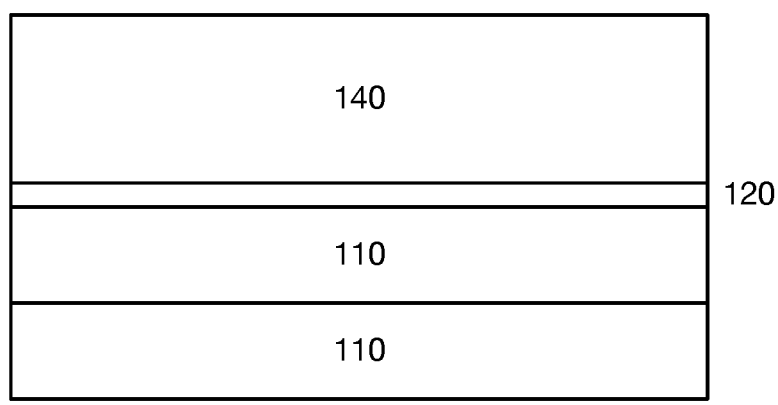
FIGS. 3A and 3B are cross-sectional views of a display of an invention embodiment.
Figure 3B:
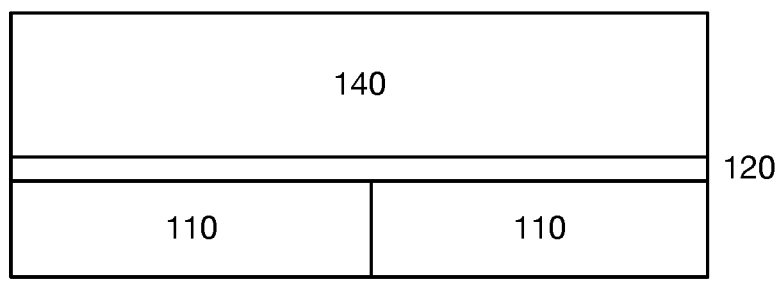

The display 100 preferably includes a single light source 110, but may additionally or alternatively include multiple light sources 110. For example, multiple light sources 110 may be placed in series and/or in parallel as shown in FIG. 3A and FIG. 3B respectively. Note that any combination of light sources 110, polarizers 130, quarter-waveplates 131, and/or additional optics (e.g., mirrors, lenses, etc.) may be used in the display 100. In configurations utilizing multiple light sources 110, the light sources 110 may be offset, angled, rotating, curved, or otherwise configured in any manner.

The light source 110 may include optical elements (e.g., lenses, mirrors, waveguides, filters) that function to couple light into the parallax generator 120 and/or the high-index optical volume 140. For example, the light source 110 may include a collimating lens designed to increase collimating of the light source 110 output. As a second example, the light source no may include a lens designed to scale (or otherwise distort) light source no output (e.g., reduce in size or increase in size). Such a lens may scale light source no output uniformly (e.g., 2× decrease in both image dimensions) or non-uniformly (e.g., no decrease in first image dimension, 4× decrease in other image dimension). As a third example, the light source no may include a lens that manipulates the focal plane of the viewed image; such a lens may be tunable (allowing depth of field to be swept). If such a lens is tunable at a high rate, this may provide an expanded perceived depth of field to a viewer.

The light source no may additionally or alternatively include any passive or active optical elements to prepare light for use by the display 100 for any other purpose. For example, the light source no may include filters or splitters. As a more specific example, the light source no may include a polarizing filter if the native output of the light source no is unpolarized. As another example, the light source no may include microlens arrays and/or Fresnel lenses.

The parallax generator 120 functions to generate an angle-dependent view from the light source 110 output. The parallax generator 120 may be any structure capable of generating such an angle-dependent view (e.g., lenticular lenses, micro-spherical lenses, parallax barriers, etc.).

Figure 4:
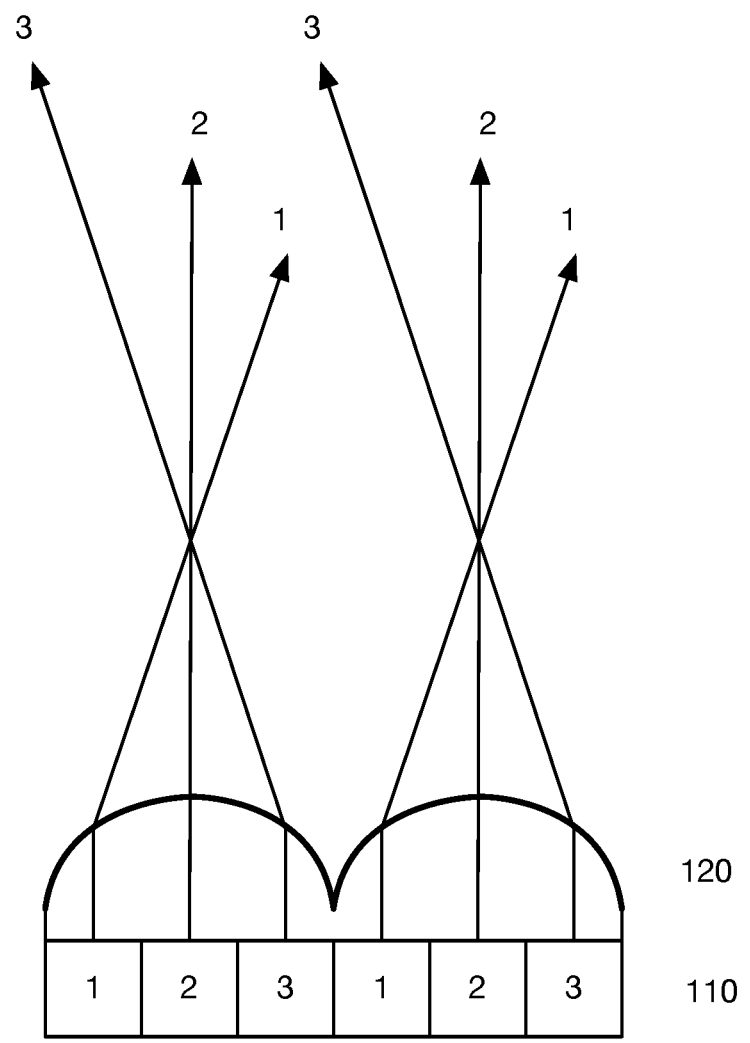
FIG. 4 is a cross-sectional view of a parallax generator of a display of an invention embodiment.

In a first example, the parallax generator 120 is a lenticular lens. The lenticular lens generates an angle dependent view in combination with a light source 110 that displays different pixels (or image segments) based on the positioning of the lenticular lens over the light source no. For example, as shown in FIG. 4, the image shown to viewers at three angles is comprised of the pixels labeled 1, 2, and 3, respectively.

Based on the properties of the lenticular lens (e.g., pitch, material, structure, orientation and position relative to the light source 110) and desired viewing characteristics (e.g., number of viewers, view distance, number of views desired, viewing mode, etc.), the display 100 may modify the output of the light source no to produce a desired result.

In one example embodiment, the number of different views provided by the display 100 is sufficient for superst-ereoscopic viewing at some viewing distance; that is, each eye of the viewer receives a different image from the display 100, and as the viewer moves around the display 100, the views change (with the viewing angle). For example, a viewer at angle one may see scene 1 with a right eye and scene 2 with a left eye, where scene 1 and scene 2 create a stereoscopic three-dimensional view of one or more objects. After the viewer moves from angle one to angle two, the viewer now sees scene 2 with the right eye and scene 3 with the left eye, producing a second stereoscopic three-dimensional view of the one or more objects. In this manner, the viewer perceives a three-dimensional image (thanks to the stereoscopic effect) at a given viewing angle, and that perception is preserved (thanks to the changing views, which correspond to a rotated view of the one or more objects) as the viewer moves around the display 100, as shown in FIG. 2A (corresponding to a first view) and FIG. 2B (corresponding to a second view). A display that produces more than one stereoscopic three-dimensional view in this manner may be referred to as a superstereoscopic display.

The lenticular lens may have any suitable configuration and structure and may be made of any suitable material. The lenticular lens is preferably one-dimensional (e.g., cylindrical lenses arranged in columns), but may additionally or alternatively be a two-dimensional lenticular lens, fly-eye lens array, or integral imaging lens array. Note that while there is preferably a correlation between addressable segments (e.g., pixels) of the light source 110 and the lenticular lens, the lens columns of the lenticular lens need not be at a particular orientation relative to the light source 110. For example, while columns of the lenticular lens may be aligned with pixel columns, they may also be offset at an angle (which allows the resolution loss due to image slicing to be apportioned across both image pixels columns and rows, rather than only one of these). This technique is described further in U.S. Pat. No. 6,064,424. Image slicing or division (of light source 110 output) may be accomplished in any manner to achieve a desired viewing result. Processing of the image is preferably performed by the onboard computer 150 but may additionally or alternatively be controlled by any computer system.

Figure 5A:
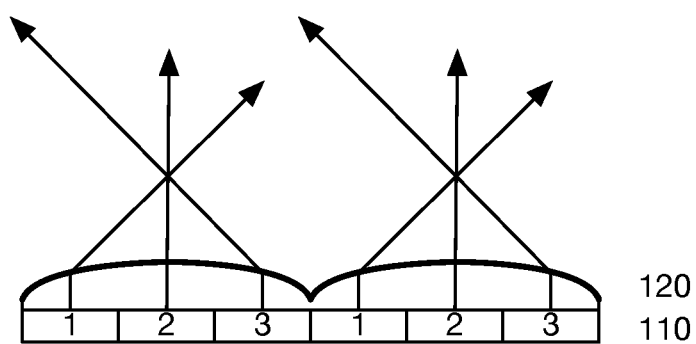
FIG. 5A is a cross-sectional view of a lenticular lens in a stretched configuration of a display of an invention embodiment.
Figure 5B:
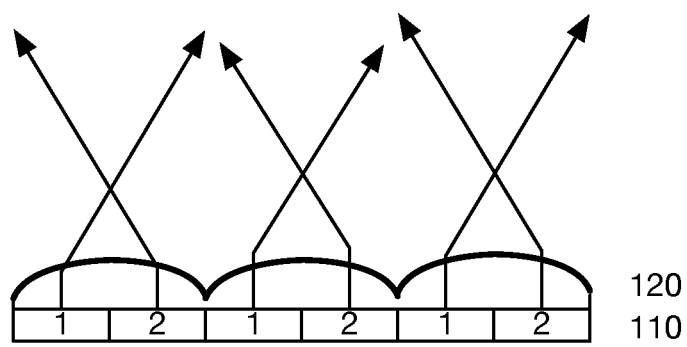
FIG. 5B is a cross-sectional view of a lenticular lens in a compressed configuration of a display of an invention embodiment.

Note that lenticular lenses may be reconfigurable to change the optical properties of the lenses. For example, a lenticular lens may be fabricated of a flexible or semi-flexible material so that the lens can be physically compressed or stressed to change the pitch of the lens, as shown in FIGS. 5A (stretched) and 5B (compressed), and the pixel-to-lens mapping may be changed accordingly. Additionally or alternatively, the optical properties of the lens may be altered by another mechanism (e.g., by modifying the index of refraction of the lenticular lens). As another example, a lenticular lens may be implemented using a layered liquid crystal array (either as the entire lens or in conjunction with a fixed refractive lens), enabling dynamic configuration of the lenticular lens.

The display 100 may include multiple lenticular lenses and/or other lenses to produce a desired optical effect. For example, 1D lenticular lenses may be stacked at different orientations to create 2D angular view dependence.

In a second example, the parallax generator 120 is a pinhole array or parallax barrier. In a third example, parallax generation may be provided by multiple light sources no.

For example, a set of projectors at different angles and a viewing angle-dependent film or surface (together functioning as both the parallax generator 120 and the light source no) may be used to produce a similar viewing effect to a single light source no and an overlaid parallax generator 120.

Polarizers 130 and quarter waveplates 131 may be used to enhance the quality of the image output of the display 100. For example, in the configuration as shown in FIG. 1, the polarizers 130 and quarter waveplate 131 may increase perceived image contrast or brightness (by suppressing errant reflection). This same effect may be used, for example, to reduce any image ghosting caused by the parallax generator 120 (in this case, the 'ghost' images may be of a different polarization than intended/on-axis images).

While polarizers 130 and quarter waveplates 131 may be laminated onto the optical volume 140, it may be desirable for these (and other) optical components to be separated by some material (or air/vacuum) in order to prevent the loss of light from the optical volume 140 that may result from frustrated total internal reflection (FTIR) since the polarizers 130/quarter waveplates 131 may have an index between that of the optical volume 140 and the surrounding air.

The high-index optical volume 140 functions to enhance viewing of the display 100 by enhancing perceived separation between on-angle views (i.e., primary views) and off-angle views.

The high-index optical volume 140 is preferably a solid rectangular prism of an optically clear material (e.g., acrylic, glass, polycarbonate), but may additionally or alternatively be any three-dimensional volume (made of any materials in any structure) capable of transmitting light and having an index of refraction greater than one. For example, the high-index optical volume may be acrylic and have a relative index of refraction of 1.49.

Figure 6A:
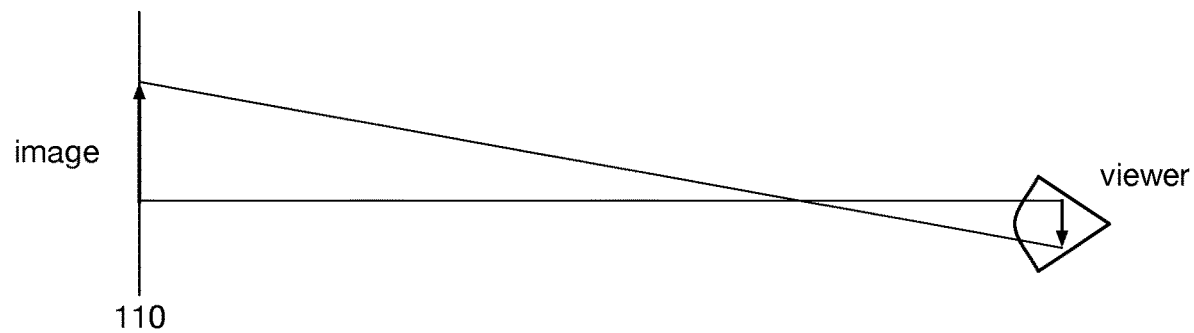
FIG. 6A is a light path view of an image projected from a light source of a display of an invention embodiment.
Figure 6B:
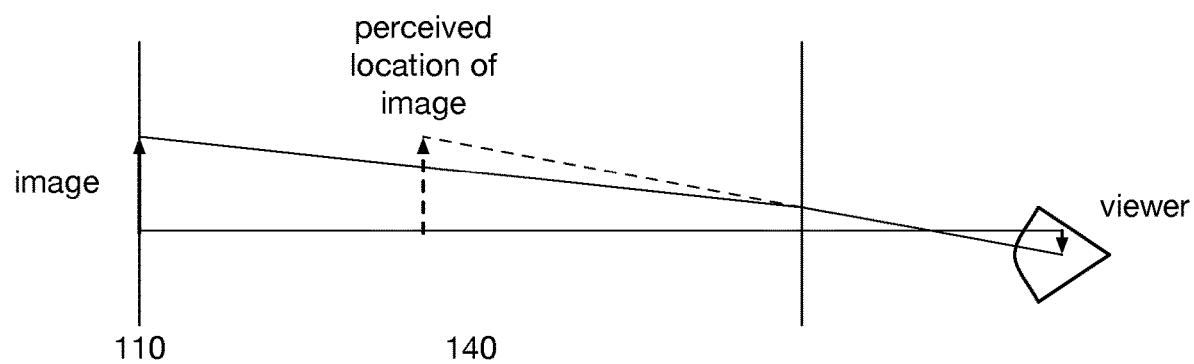
FIG. 6B is a light path view of an image projected from a light source and passing through a high-index optical volume of a display of an invention embodiment.

As shown in FIG. 6A, by itself, a light source no can create an image on the eye of a viewer. After incorporating the high-index optical volume 140, the image formed on the viewer's eye is smaller, suggesting that the perceived image with the optical volume 140 in place is either closer (e.g., as shown by the perceived location of image) or larger than it would be without optical volume. Given appropriate relative size clues (e.g., physical boundaries of the display) it is likely that a viewer may perceive the image as closer (e.g., 'floating' within the optical volume 140), as shown in FIG. 6B. The optical volume 140 may have the additional benefit of increasing viewing angle of the display 100 (by bending light toward on-axis viewing).

Figure 7:
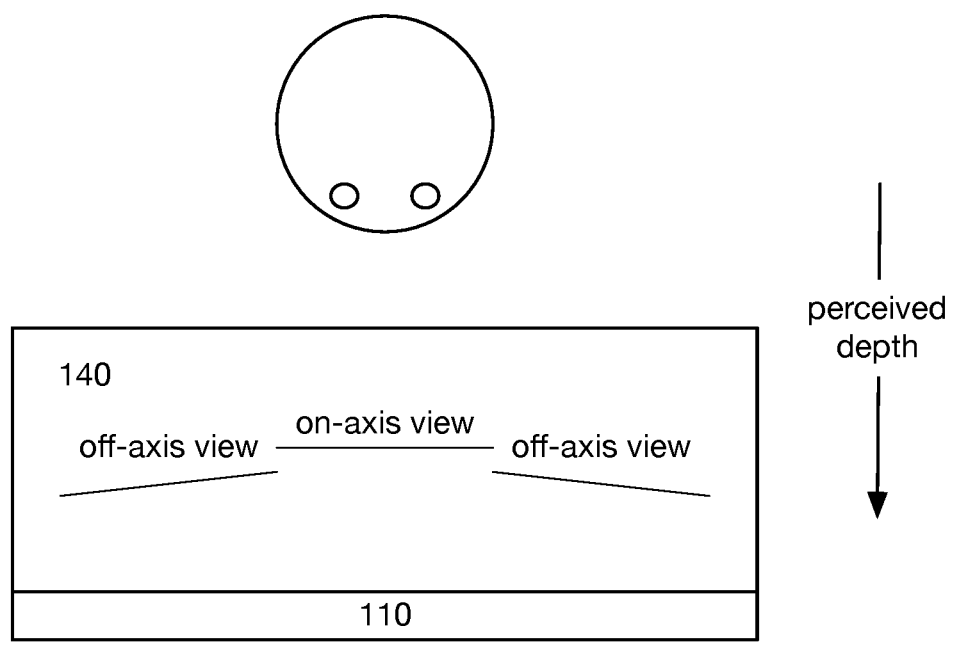
FIG. 7 is a top-down view of a display of an invention embodiment.

In some configurations of the optical volume 140 (e.g., a rectangular prism of uniform index of refraction), this effect is less prominent at viewing angles off-axis (e.g., not perpendicular to the light source 110 and optical volume 140), as shown in FIG. 7. This may result in separation between on-angle and off-angle views, further enhancing the depth effect enabled by stereoscopic images.

The display 100 may additionally include optical volume guides 141, which function to enhance the 'floating' effect of images within the optical volume 140. The optical volume guides 141 are preferably markings visible on the optical volume 140 (or otherwise within the optical path of the light source 110) that draw a viewer's eye to aid in providing the sensation of depth to images of the display 100.

The optical volume guides 141 may be any visible two- or three-dimensional structure present in a plane distinct from (and preferably parallel to) the perceived plane locating a primary/on-axis image viewed by a viewer. For example, the optical volume guides 141 may be etched, painted, adhered, or printed onto the surface of the optical volume 140. Additionally or alternatively, the optical volume guides 141 may be located on a separate light guide, substrate, or on any other component.

Figure 8:
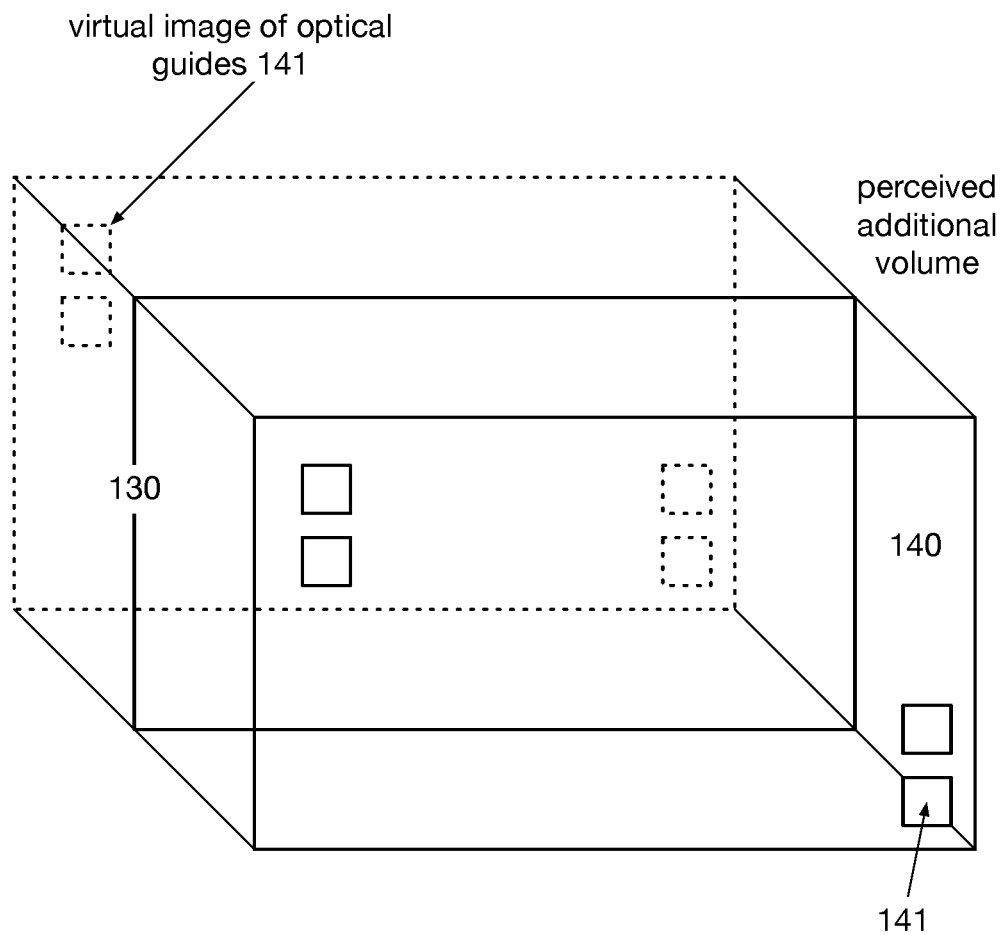
FIG. 8 is a perspective view of a high-index optical volume and perceived additional volume of an invention embodiment.

In one implementation of an invention embodiment, the optical volume guides 141 are reflective on at least one surface. In this implementation, the system 100 incorporates a reflective polarizer 130 (or other reflective or partially reflective surface) to create a virtual image of the optical volume guides 141, creating the perception of a volume larger (e.g., twice as large) than the optical volume 140's originally perceived size, as shown in FIG. 8 (the optical volume 140's originally perceived size may be smaller than its actual size due to the use of high-index material).

Note that the use of optical volume guides 141 may also enable the three-dimensional effect of the display 100 to be better perceived in (two-dimensional) video recordings than other displays, allowing for the full impact of display 100 to be better communicated over film.

Figure 9A:
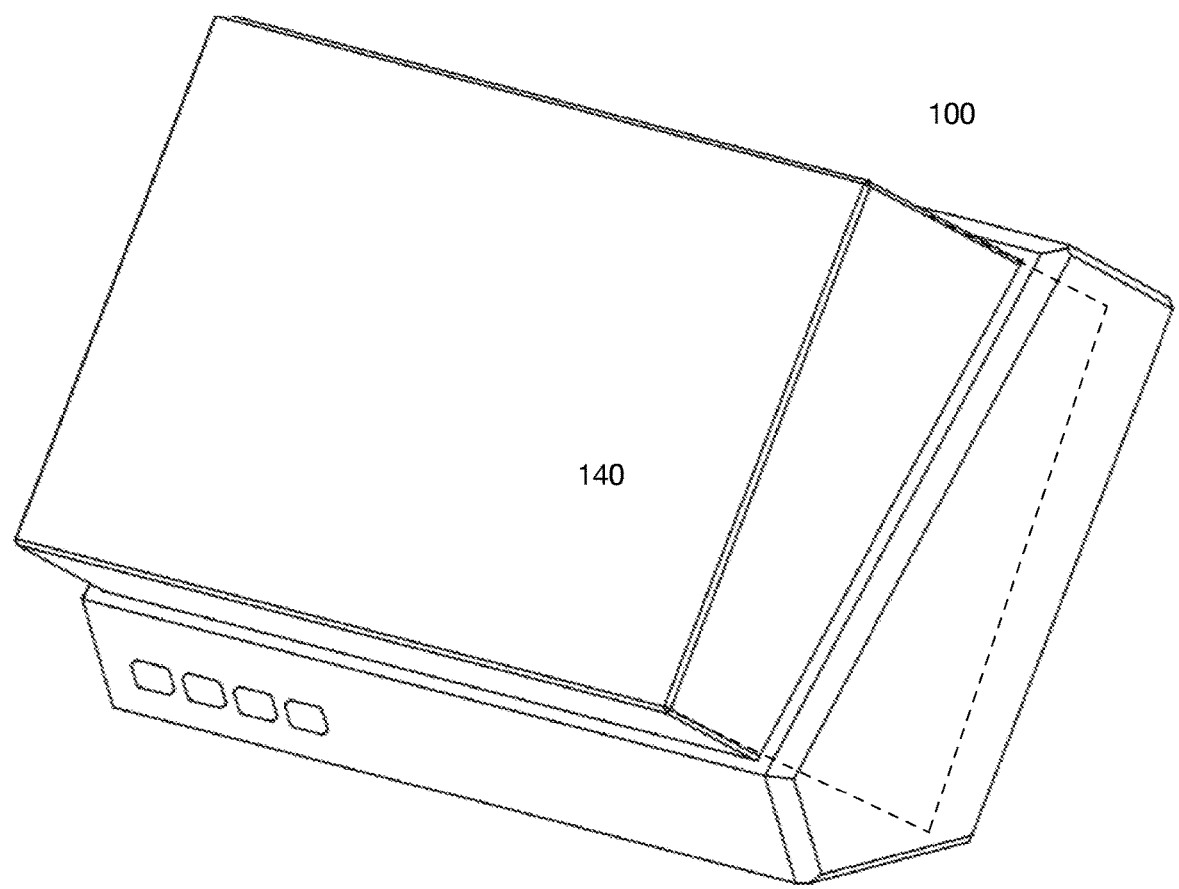
FIGS. 9A, 9B, and 9C are various perspective views of a display of an invention embodiment.
Figure 9B:
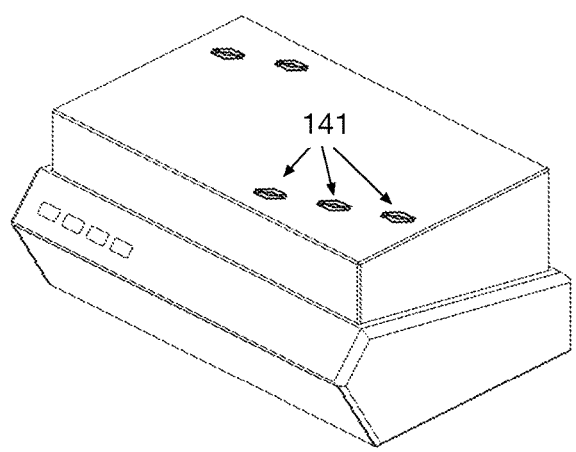
Figure 9C:
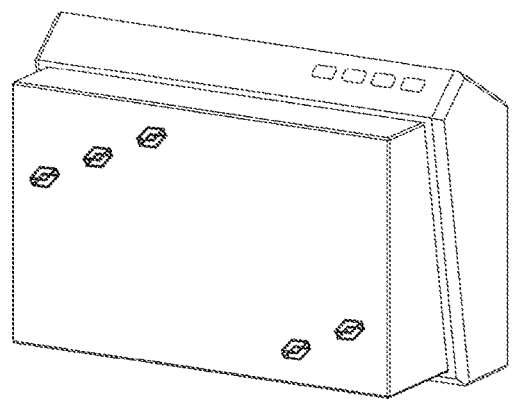

The display 100 may additionally or alternatively use opaque elements (e.g., portions of an opaque housing) to surround or partially surround sides of the optical volume 140, further enhancing the perception of depth (and potentially also reducing the presence of undesired light), as shown in FIG. 9A. Additional views of this example implementation are as shown in FIG. 9B and FIG. 9C (including optional optical volume guides 141).

Likewise, the display 100 may be used with other displays 100 in any manner (e.g., in a 2×2 or 3×3 array, back to back).

The onboard computer 150 functions to perform image processing for image data received by the display 100 prior to display by the light source 110. For example, the onboard computer may separate 3D model information into slices to be projected by the light source 110. The onboard computer 150 may additionally or alternatively function to prepare 3D image data for voxel representation in any manner. For example, the onboard computer 150 may generate 2D stereoscopic views based on the structure/configuration of the parallax generator 120. As another example, if light folding is performed by the display 100 (i.e., images are sliced and anisotropically scaled), the onboard computer 150 may perform interpolation between pixel values to determine a new transformed pixel value. As another example, the onboard computer 150 may perform dithering to simulate blurring at image edges. As a third example, the onboard computer may send control commands (e.g., to the contextual lighting system 160).

The onboard computer 150 may additionally or alternatively function to control general properties of the light source 110 or of other aspects of the display 100; for example, the onboard computer 150 may control brightness of light source no pixels to simulate changes of opacity in a displayed image.

Note that the functions described as performed by the onboard computer 150 may additionally or alternatively be performed by another computer system (e.g., a distributed computing system in the cloud).

In one implementation of an invention embodiment, the onboard computer 150 is communicative with another electronic device (e.g., a smartphone, a tablet, a laptop computer, a desktop computer, etc.) over a wired and/or wireless communication connection. In this implementation, data may be streamed or otherwise communicated between the onboard computer 150 and the other electronic device. For example, a smartphone may transmit video information to the onboard computer, where it is sliced into depth slices by the onboard computer 150. Additionally or alternatively, depth slicing may be performed by the other electronic device. In general, the task of image processing may be performed and/or split between any number of electronic devices communicative with the onboard computer 150.

The contextual lighting system 160 functions to light the periphery of the display 100 (or nearby area) with a light meant to match or resemble lighting conditions programmed into digital imagery displayed by the display 100. By doing so, the contextual lighting system 160 can 'lock' the imagery in the real world for some users; for example, a user's hand may be lit to match the lighting of a particular part of a digital scene near the user's hand. This may substantially increase immersiveness.

The contextual lighting system 160 may control lighting properties (e.g., color, duration, intensity, direction, degree of focus, collimation, etc.) based on explicit instructions in the digital imagery. Additionally or alternatively, the contextual lighting system 160 may control lighting properties in any manner. For example, the contextual lighting system 160 may (for digital images without explicit contextual lighting instructions) average the color across a subset of an image and light the display 100 with this light.

The contextual lighting system 160 may include any number and/or type of lighting devices; for example, color controllable LEDs.

The contextual lighting system 160 is preferably controlled by the onboard computer 150, but may additionally or alternatively be controlled by any controller or computer system.

The display 100 may also include means for interaction tracking. For example, the display 100 may include a depth camera that tracks user interaction with the display 100, allowing control and/or manipulation of the image displayed based on hand gestures and/or other interaction between a viewer and the display 100 as measured by the depth camera. As another example, the display 100 may include a transparent touch sensor that tracks viewer touch interactions on surfaces of the display 100.

In one implementation of a preferred embodiment, the display 100 includes an ultrasonic haptic feedback module and a head tracker (e.g., a camera or other device that tracks head position, orientation, and/or motion). In this implementation, tactile feedback via the haptic feedback module may be modified according to head tracking data (or other data, e.g., hand tracking data, body tracking data, video/audio capture data, etc.). Tactile feedback may also be provided by haptic gloves that are coordinated through the onboard computer 150 to provided tactile feedback that is coincident with the visual feedback of the system.

In another implementation of a preferred embodiment, the display 100 includes an infrared-opaque wand for interaction with aerial display (e.g., the wand is air gap or water containing, or of an IR blocking but visible-light transparent plastic or glass). This wand functions as an interaction instrument (in addition to a user's bare hands) that can be read by a depth camera, but which does not block the light of the aerial image like a visible-light interaction instrument or a hand would, in the case of interaction that extends past the plane of the aerial image. Additionally or alternatively, the wand may feature an infrared reflector and/or light emitter to better enable tracking. In some example, the wand may include internal gyros and accelerometers to provide six degree-of-freedom tracking.

The display 100 may additionally or alternatively include voice control (e.g., via an automated assistant such as Amazon's Alexa).

Tracking and interaction are preferably controlled by the onboard computer 150, but may additionally or alternatively be controlled by any controller or computer system.

Note that while the components of the display 100 are shown in particular configurations, it is understood the that components of the display 100 may be coupled/ordered in any manner to produce the effects as described in the present application.

2. Superstereoscopic Display Image Processing

In traditional stereoscopic displays, the display is typically optimized for a fixed number of viewers at a set distance. For example, in a traditional stereoscopic display featuring a lenticular lens, a viewer must remain within a bounded volume (both in terms of viewing distance, along the viewing axis, and distance perpendicular to the viewing axis). This is a huge disadvantage to these systems. With the advent of head tracking (or other mechanism to infer the location of a user's eyes as they move in space), some stereoscopic displays modify the projected image to extend the viewing volume.

Figure 10A:
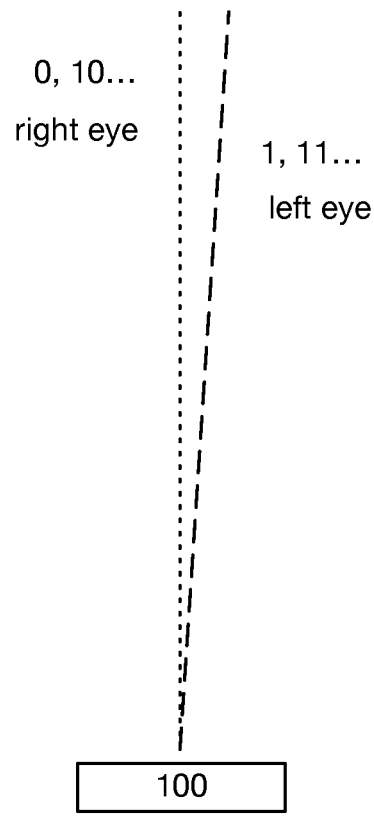
FIGS. 10A and 10B are top-down views of image view dependency on viewing distance of a display of an invention embodiment.
Figure 10B:
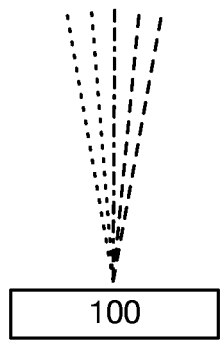

The display 100 is able to address this issue in a substantially more robust manner. For example, the display 100 may compensate for viewing distance (as determined by a head tracker or other mechanism for determining the distance of a viewer from the display 100, such as a camera) by modifying the image projected to the parallax generator 120 (and/or by modifying the optical properties of the parallax generator 120 itself) at the onboard computer 150 (or otherwise). Viewing distance is important because the light projected by a lenticular lens follows constant angle (so the lateral space between rays increases with viewing distance). An example of this is as shown in FIGS. 10A and 10B. At a first viewing distance, a user may perceive a first image (e.g., corresponding to pixel columns 0, 10, 20, etc.) with one eye and a second image with the other eye (e.g., corresponding to pixel columns 1, 11, 21, etc.). This is similar to viewing a traditional lenticular lens-based stereoscopic display at optimal viewing distance. At a second, closer, distance, the user may perceive several images with each eye (as the lateral distance between views is closer). For example, a user may perceive three images (e.g., corresponding to 0, 10, 20 . . . ; 1, 11, 21 . . . ; 2, 12, 22) with a first eye and three images (e.g., corresponding to 2, 12, 22 . . . ; 3, 13, 23 . . . ; 4, 14, 22) with a second eye-note that the images may overlap at close distances. The display 100 is capable of adapting to this change in viewing angle in one or more ways. For instance, the display 100 may dim or turn off pixel columns that would appear brightly to both eyes of an individual viewer. Even if views do not overlap, note that in the closer viewing distance each eye is capable of seeing more pixels. The display 100 may adapt to this in any of several manners; for example, the display 100 may increase the resolution of a displayed image without changing the pictured scene, either via interpolation, by selecting a higher-resolution source, or if the image is generated in real-time, changing the resolution of the generated image. Another issue with changing viewing distance is that the lenticular lens may noticeably distort images (e.g., stretching them horizontally or otherwise changing aspect ratio) in a viewing-distance dependent manner. The display 100 may adapt to this issue by resealing the displayed image either vertically or horizontally to correct the perceived aspect ratio by a viewer at a set distance.

Note also that viewing distance affects perceived depth (due to differences in separation of the stereoscopic images); the display 100 may additionally or alternatively modify image output to preserve a given depth perception.

To the extent that the parallax generator 120 varies views horizontally (e.g., as with a columnar lenticular lens), it may also be desirable to modify views displayed by the display 100 to reflect vertical movement (e.g., a user changing viewing height). The display 100 may do this by detecting a y-axis viewing disparity (e.g., a viewing height relative to some reference) and changing the perspective of the displayed image accordingly. For example, a user with a viewing height above a reference might see a scene from a slightly elevated angle, whereas when that user squats the user might see the scene from an even or depressed angle. If the display 100 is generating the view in real time from a 3D source, this may be as simple as changing the 2D output of the light source 110 to reflect the change in angle. If the source is limited in possible perspectives, the display 100 may additionally or alternatively distort the 2D output of the light source 110 to simulate a change in elevation based on user viewing height.

These are examples of accommodations that the display 100 can make when tracking a user's head. The display 100 may additionally track multiple viewers at the same time. In some senses this is similar to the single-user case—just as "views" (distinct images projected at different angles) may be allocated to a single user's eyes dependent on viewing distance, they may in general be allocated to multiple users. In the single user case, a primary concern with views generally outside of perception is cross-talk—i.e., that users may see images not intended to reach their eyes (because they are off-angle). While ghost images are typically dimmer than primary images (those intended to reach a user's eyes) they may still cause blurring. In the single user case, it may be possible simply to turn off views that cause ghosting (or to time multiplex views that are reaching a viewer's eyes). This may still be possible in the multi-user case as well, but the "ghost" views for one person may be the primary views for another, and thus this is a higher complexity issue. Another primary concern with views is the distinction between "natural" and "artificial" views. As an individual moves his or head laterally, the user sees sequentially different views (even though these views may be identical)—this is a function of the lenticular lens—but eventually the views shown to the user repeat unless the light output of the display 100 changes (due to an effect known as ray crossover). These views (those that exist without changing the light output of the display 100) are "natural" views. Additionally, the display 100 may modify the light output of the display 100 to provide a continuous view even across the boundaries of "natural view" zones. In other words, the display 100 may track (based on user viewing position) what views are shown to a user, and update display output as a user approaches a view boundary. For example, in a lenticular lens that has a period of ten pixel columns, as the user approaches the tenth pixel column, the display 100 may change the output of pixel column 1 to appear as "pixel column 11" (assuming the goal is to maintain a continuous view around a scene).

This principle applies in the multi-user scenario as well, except that views are now divided across users (to the extent that different images need to be shown to different users, such as if they are at different viewing distances, viewing heights, or are intended to see different content). The display 100 may divide views across multiple users in any manner and may apply the various image refinement techniques discussed above to views presented to these users in any manner.

The display 100 may additionally or alternatively smooth transitions between applications of these image refinements. This may be particularly important in the case of "view crash", when one user, previously shown an image in a modified fashion (e.g., projected to provide perception of a first viewing height) moves into the natural view zone of another user being shown a different perspective of that image (e.g., projected to provide perception of a second, different viewing height). In such a scenario, the display 100 may detect that a view crash is likely to occur, and may change the output presented to one or more users to (ideally) bring the views presented to different users to unity as the users' views "crash" (i.e., begin to intersect).

As another example of transition smoothing, the display 100 may damp transitions. This may be particularly useful in scenarios where head tracking produces erroneous values: transition damping may prevent views from rapidly changing if erroneous values occur. Also, if the display 100 loses head tracking lock on a viewer, the display 100 may attempt to perform dead reckoning until lock is regained.

Additionally or alternatively, aspects of displayed images may be modified based on environmental factors (e.g., temperature, humidity, altitude, etc.). Aspects of displayed images may also be modified to maintain compatibility between images in implementations of the display 100 featuring multiple light sources (e.g., as in an array of displays 100).

Note that, as shown in FIG. 7, off-axis views in a high-index volume may appear at different perceived depths (due to the different distance traveled by light within the high-index volume with angle, at least for a non-radially-symmetric volume), so the image refinement techniques above (and display in general) may be additionally modified to account for the geometry and optical properties (particularly, index of refraction) of the high-index optical volume 140.

As a person skilled in the art will recognize from the previous detailed description and from the figures and claims, modifications and changes can be made to the preferred embodiments of the invention without departing from the scope of this invention defined in the following claims.

We claim:

1. A superstereoscopic display comprising:
   a light source;
   a parallax generator optically coupled to the light source that, with the light source, generates a light output having viewing angle dependency; and
   a tracking sensor, wherein the light source is configured to modify the light output to enable superstereoscopic viewing of a three-dimensional image for a viewer based on at least one of head tracking data or eye tracking data, the at least one of head tracking data or eye tracking data corresponding to the viewer and captured by the tracking sensor;
   wherein the light source transmits the light output to free-space; wherein the light output comprises a first visible image at a first viewing angle and a second visible image, non-identical to the first visible image, at a second viewing angle separated by a first non-zero angle from the first viewing angle; wherein the first and second visible images correspond to views of the three-dimensional image and enable superstereoscopic viewing of the three-dimensional image; wherein the light source further modifies the light output in response to the viewer moving relative to the display by performing at least one of:
   modifying the light output to reduce view ghosting;

modifying the light output to correct for aspect ratio distortion; or modifying the light output to correct for depth perception change.

2. The superstereoscopic display of claim 1, further comprising an optical volume, wherein the light source transmits the light output to the optical volume, wherein the optical volume transmits the light output to free-space.

3. The superstereoscopic display of claim 2, wherein an index of refraction of the optical volume is at least 1.4.

4. The superstereoscopic display of claim 1, further comprising a set of light guides that enhance a depth perception of images displayed by the display.

5. The superstereoscopic display of claim 1, wherein the parallax generator comprises a one-dimensional lenticular lens parallel to addressable columns of the light source.

6. The superstereoscopic display of claim 5, wherein the one-dimensional lenticular lens is oriented at an angle of more than zero but less than ninety degrees relative to the addressable columns of the light source.

7. The superstereoscopic display of claim 1, further comprising a reflector proximal an optical volume, wherein the three dimensional image is perceived within the optical volume.

8. The superstereoscopic display of claim 1, wherein the light source damps modifications of the light output in response to changes in the head or eye tracking data.

9. The superstereoscopic display of claim 1, wherein the light source modifies the light output to provide a perspective of the three-dimensional image to the first viewer based on at least one of a viewing angle, a viewing distance, or a viewing height of the viewer.

10. The superstereoscopic display of claim 1, wherein the light source further modifies the light output to enable superstereoscopic viewing of the three-dimensional image for a second viewer based on head or eye tracking data corresponding to the second viewer.

11. A superstereoscopic display comprising:
a light source;
a lenticular lens optically coupled to the light source that, with the light source, generates a light output having a viewing angle dependency; and
an optical volume guide configured to enhance a depth perception of an image displayed by the superstereoscopic display;
wherein the light source transmits the light output to an optical volume; the light output comprises a first visible image at a first viewing angle and a second visible image, non-identical to the first visible image, at a second viewing angle separated by a first non-zero angle from the first viewing angle; wherein the first and second visible images correspond to views of a three-dimensional image and enable superstereoscopic viewing of the three-dimensional image within the optical volume.

12. The superstereoscopic display of claim 11, wherein the optical volume comprises an optical block with an index of refraction greater than or equal to 1.4.

13. The superstereoscopic display of claim 12, wherein the optical volume guide is etched, painted, adhered, or printed onto a surface of the optical volume.

14. The superstereoscopic display of claim 11, further comprising opaque elements partially surrounding a side of the optical volume.

15. The superstereoscopic display of claim 14, wherein the opaque elements enhance the perception of depth in the three-dimensional image.

16. The superstereoscopic display of claim 11, wherein the optical volume guides are reflective.

17. The superstereoscopic display of claim 11, further comprising a lighting system configured to light a periphery of the superstereoscopic display.

18. The superstereoscopic display of claim 11, further comprising a tracking sensor, wherein the light source is configured to modify the light output to enable superstereoscopic viewing of the three-dimensional image for the viewer based on at least one of head tracking data or eye tracking data, the at least one of head tracking data or eye tracking data corresponding to the viewer and captured by the tracking sensor.

19. The superstereoscopic display of claim 18, wherein the light source is further configured to smooth transitions between modifications of the light output.

20. The superstereoscopic display of claim 18, wherein the light source modifies the light output based on a viewing distance of the viewer from the superstereoscopic display.

* * * * *

UNITED STATES PATENT AND TRADEMARK OFFICE
CERTIFICATE OF CORRECTION

PATENT NO. : 11,683,472 B2
APPLICATION NO. : 17/328076
DATED : June 20, 2023
INVENTOR(S) : Shawn Frayne It is certified that error appears in the above-identified patent and that said Letters Patent is hereby corrected as shown below:

On the Title Page

Page 3, Column 1, Other Publications, Line 3, Delete "Autosteroscopic" and insert --Autostereoscopic-- therefor In the Claims Column 10, Line 64, In Claim 1, after "source", delete "further"

Signed and Sealed this
Eighth Day of August, 2023

Katherine Kelly Vidal
*Director of the United States Patent and Trademark Office*